(No Model.)
D. CROWTHER.
VEHICLE WHEEL.
No. 501,992.  Patented July 25, 1893.
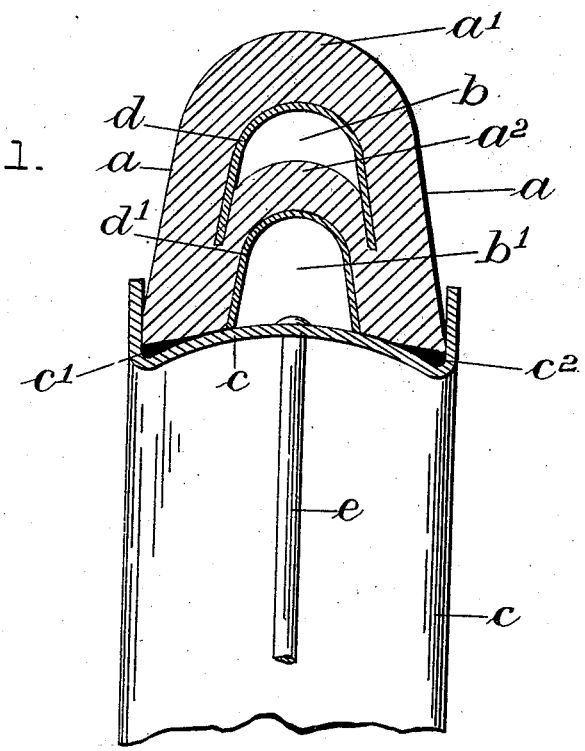
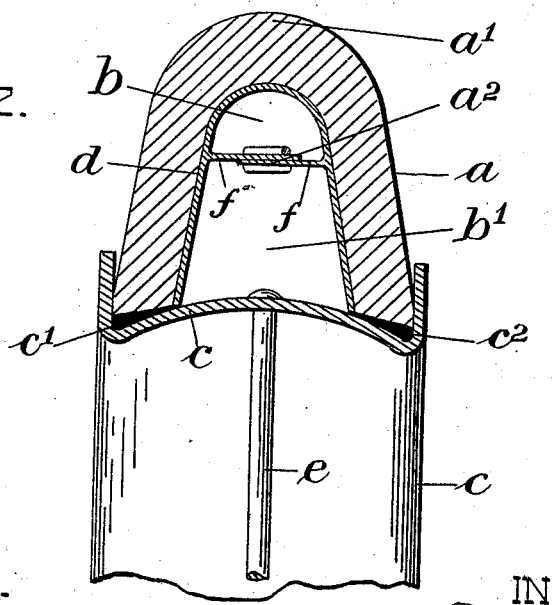
WITNESSES:
INVENTOR:
David Crowther.
by Herbert W. T. Jenner
Attorney.

UNITED STATES PATENT OFFICE.

DAVID CROWTHER, OF HUDDERSFIELD, ENGLAND.

VEHICLE-WHEEL.

SPECIFICATION forming part of Letters Patent No. 501,992, dated July 25, 1893.

Application filed February 27, 1893. Serial No. 463,888. (No model.)

*To all whom it may concern:*

Be it known that I, DAVID CROWTHER, a subject of the Queen of Great Britain, residing at Huddersfield, in the county of York, England, have invented certain new and useful Improvements in Cycle and other Vehicle Wheels; and I do hereby declare the following to be a full, clear, and exact description of the invention, such as will enable others skilled in the art to which it appertains to make and use the same.

This invention relates to flexible tires and to the rims of cycle and other wheels of light construction.

The object of my invention in flexible or india rubber tires is to make them more resilient and better adapted to cushion the wheel than a solid or ordinary cushion tire, and to possess more of the characteristics of a pneumatic or inflated tire, but without the same liability to collapse by reason of a slight puncture made therein, or to cause the wheel to skid or slip sidewise from under the rider when running over a slanting or greasy surface.

To the aforesaid purpose my invention consists in the novel and peculiar construction of tire and rim therefor, all as hereinafter fully described.

In the accompanying drawings, Figure 1 is a transverse section of my improved tire and rim. Fig. 2 is a transverse section of a modified construction of tire.

In the said drawings like letters of reference designate corresponding parts throughout.

Letter $a$ denotes the tire composed of india rubber or similar flexible material which is molded with an outer arch $a'$ forming the bearing surface of the tire, and an inner arch $a^2$. $b$ is an annular air space left between the two said arches and $b'$ forms a second air space when the tire is fitted into the rim $c$. The sides of the tire incline outwardly at tangents to the outer arch from top to bottom, and the width at the base exceeds the width of the metal rim $c$ which is adapted to receive the tire. The rim $c$ is also bent or arched and has its edges turned up perpendicularly, forming grooves $c'$, $c^2$, at each side of the rim. To fit the tire into position in the rim the two sides thereof require to be pressed toward each other. This the flexibility of the tire permits, and when in position the elasticity of the rubber presses the two sides of the tire tightly against the upturned edges of the rim by which means and also by running cement into the grooves $c'$, $c^2$, the tire is firmly secured in the rim. Pressure, from weight on the wheel causes the outer arch $a'$ to be depressed into the air space $b$ against its own resistance, but increase of depression brings the said outer arch $a'$ into engagement with the inner arch $a^2$, which therefore considerably increases the resisting power of the tire to depression, and by being entirely out of contact with the middle of the metal rim more effectively cushions the wheel.

The aforesaid construction of tire thus gives greater resilience than an ordinary cushion or solid tire and more nearly resembles in its characteristics a pneumatic or inflated tire, but is not liable to collapse if punctured. The depression of the outer arch $a'$ causes the sides of the tire to expand toward the perpendicular and affords to the momentarily bearing part of the tire an extended surface, which reduces liability of the wheel to skid or slip from under the rider when on greasy or inclined surfaces.

Sheets of canvas $d$, $d'$, are placed around the inner walls of the arches $a'$, $a^2$, the former during manufacture of the tire so that it may more firmly adhere thereto than if secured to said wall with cement or glue, and also for the purpose of reducing liability of the outer arch being "blown" when the tire is vulcanized. The canvas sheet $d'$ is cemented on afterward, the two sheets serving to strengthen the tire.

$e$ is one of the spokes of the wheel.

In Fig. 2 I show a modification in construction of the tire which is not as difficult to manufacture as that previously described. The tire $a$ is molded with a single arch $a'$ with a sheet of canvas $d$ lining the inside walls thereof. The canvas sheet is provided at each side with inwardly projecting tabs or stubs $f$, $f$, so as to overlap each other, and which, after the tire has been vulcanized, are stitched or laced together in the center so as to form the inner arch $a^2$ and leave an air space $b$ between the two arches $a'$, $a^2$, and an inner space $b'$ below the arch $a^2$.

I claim as my invention—

1. A flexible tire, consisting of a hollow arch-shaped top portion $a'$, the flat outwardly-diverging sides, and the inner arch-shaped portion $a^2$ joining the said sides, substantially as and for the purpose set forth.

2. The combination, with a flexible tire having an outer arched bearing surface $a'$, flat outwardly diverging sides an inner arch $a^2$ an air space $b$ between the said arches, and an open space $b'$ below the inner arch $a^2$, of the sheets or layers of canvas $d$, $d'$, forming a lining to the inner walls of the arches, substantially as and for the purposes set forth.

In testimony whereof I affix my signature in presence of two witnesses.

DAVID CROWTHER.

Witnesses:
ARTHUR B. CROSSLEY,
  *Market Street, Huddersfield.*
THOMAS H. BARRON,
  *Huddersfield.*